US010862856B2

(12) United States Patent
Bernstein et al.

(10) Patent No.: US 10,862,856 B2
(45) Date of Patent: Dec. 8, 2020

(54) DISTRIBUTED COMPONENTS IN COMPUTING CLUSTERS

(71) Applicant: Microsoft Technology Licensing, LLC, Redmond, WA (US)

(72) Inventors: Philip A. Bernstein, Bellevue, WA (US); Sergey I. Bykov, Redmond, WA (US); Jose Manuel Faleiro, Mountain View, CA (US); Gabriel Kliot, Redmond, WA (US); Muntasir Raihan Rahman, Urbaba, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/297,580

(22) Filed: Mar. 8, 2019

(65) Prior Publication Data

US 2019/0288981 A1 Sep. 19, 2019

Related U.S. Application Data

(63) Continuation of application No. 14/512,352, filed on Oct. 10, 2014, now Pat. No. 10,270,735.

(51) Int. Cl.
*H04L 29/12* (2006.01)
*H04L 29/08* (2006.01)
*G06F 16/27* (2019.01)
*G06F 9/52* (2006.01)
(Continued)

(52) U.S. Cl.
CPC .......... *H04L 61/1535* (2013.01); *G06F 9/526* (2013.01); *G06F 11/14* (2013.01); *G06F 11/16* (2013.01); *G06F 16/27* (2019.01); *H04L 67/10* (2013.01)

(58) Field of Classification Search
None
See application file for complete search history.

(56) References Cited

U.S. PATENT DOCUMENTS

| 6,438,705 | B1 * | 8/2002 | Chao | G06F 11/1425 714/4.11 |
| 7,739,677 | B1 * | 6/2010 | Kekre | G06F 11/1425 717/168 |
| 7,962,458 | B2 | 6/2011 | Holenstein et al. | |

(Continued)

FOREIGN PATENT DOCUMENTS

CN 102246489 A 11/2011

OTHER PUBLICATIONS

"First Office Action and Search Report Issued in Chinese Patent Application No. 201580054797.6", dated Dec. 26, 2019, 24 Pages.
(Continued)

*Primary Examiner* — Philip J Chea
*Assistant Examiner* — Hassan A Khan

(57) ABSTRACT

The subject disclosure is directed towards components in different server clusters, e.g., comprising software components such as components of a distributed computing system. Components are available for use by distributed computing system applications, yet managed by the distributed computing system runtime such that only a single instance can be activated and exist within communicating (non-partitioned) clusters. Also described is recovery from a situation in which no longer partitioned clusters each have created the same component.

20 Claims, 12 Drawing Sheets

(51) Int. Cl.
   *G06F 11/14* (2006.01)
   *G06F 11/16* (2006.01)

(56) References Cited

U.S. PATENT DOCUMENTS

| | | | | |
|---|---|---|---|---|
| 2002/0184553 | A1* | 12/2002 | Frolund | G06F 11/2048 714/4.4 |
| 2010/0153345 | A1* | 6/2010 | Ginkel | G06F 16/27 707/690 |
| 2010/0191884 | A1* | 7/2010 | Holenstein | G06F 11/2094 710/200 |
| 2010/0250646 | A1* | 9/2010 | Dunagan | H04L 67/2819 709/203 |
| 2011/0145204 | A1* | 6/2011 | Maple | G06F 9/466 707/682 |
| 2015/0169415 | A1* | 6/2015 | Hildebrand | G06F 3/0617 714/4.5 |

OTHER PUBLICATIONS

"Office Action issued in European Patent Application No. 15784220.4", dated Jun. 18, 2020, 9 Pages.

Narasimhan, et al., "Replica Consistency of CORBA Objects in Partitionable Distributed Systems", In Journal of Distributed Systems Engineering, vol. 4, Jan. 1, 1997, pp. 139-150.

* cited by examiner ized isolated entities, such as distributed objects, agents, actors, virtual components and so forth. In general, each such component is individually addressable and in the distributed system has a unique identity (such as an integer, GUID, string or an opaque data structure or the like).

DISTRIBUTED COMPONENTS IN COMPUTING CLUSTERS

RELATED APPLICATION

This application is a continuation application of U.S. patent application Ser. No. 14/512,352, filed Oct. 10, 2014, which is incorporated by reference.

BACKGROUND

Distributed computing systems may have software components such as software objects or other kinds of individually addressable isolated entities, such as distributed objects, agents, actors, virtual components and so forth. In general, each such component is individually addressable and in the distributed system has a unique identity (such as an integer, GUID, string or an opaque data structure or the like).

In a distributed system that allows for geographic distribution (including when two sets of servers arranged as clusters are within the same datacenter or in different datacenters), an application deployment may reside in one cluster. In such a situation, applications whose clients are widely distributed (e.g., around the world) process requests at a single datacenter, whereby clients that are distant from the datacenter may experience high latencies.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards attempting to determine if a component is already activated in any other cluster with which the attempting cluster can communicate, and if so, using the already-activated component. If not already activated, a determination is made as to whether a partition exists between at least two clusters; if a partition exists, the component is activated and associated with state data indicating that the activated component is a possible duplicate, e.g., with another instance in a partitioned cluster.

Other advantages may become apparent from the following detailed description when taken in conjunction with the drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
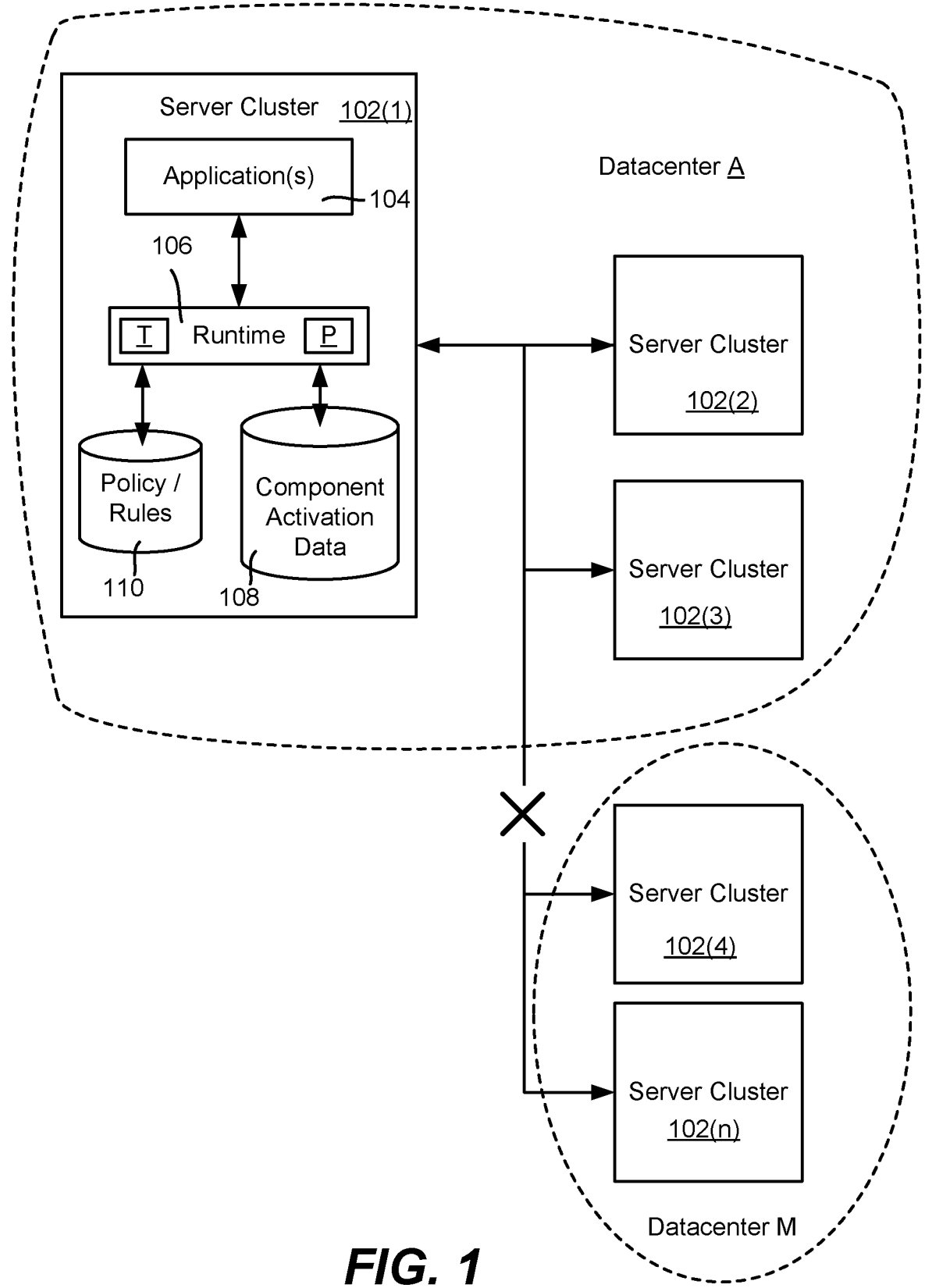
FIG. 1 is a block diagram representing example components of a distributed computing system having partitioned clusters that may be used in providing and managing components, according to one or more example implementations.

Various aspects of the technology described herein are generally directed towards allowing applications to span multiple server clusters, such as server clusters in different datacenters, e.g., in a cloud environment. Such applications activate (instantiate) components or use those already activated. Components are based upon the concepts of being always available and having a single-activation, including in a multi-cluster environment. Note that while clusters may be in multiple datacenters, the technology applies to different server clusters arranged in a single datacenter, as well as with some clusters in one datacenter and some in others, or arranged in any other suitable way.

As used herein, a cluster is a set of servers, typically running within a datacenter. A cluster has a unique identity relative to other clusters. A multi-cluster is a set of clusters, which may be geo-distributed, such as (but not limited to) clusters that reside in different datacenters. A total multi-cluster is the set of all clusters, which is statically known to every cluster. An active multi-cluster is a subset of the total multi-clusters whose members can communicate with each other; when some clusters of a total multi-cluster cannot communicate with one another, the clusters are referred to as partitioned. A quorum multi-cluster is an active multi-cluster containing a quorum of clusters in the total multi-cluster, e.g., a majority of the total clusters, or having possession of a quorum resource. There can be at most one quorum multi-cluster of a total multi-cluster. Note that each cluster is part of the quorum when there is no partition.

In a component system, applications are programmed as if any given single-activation component exists at all times. When a component is called, the runtime system activates the component if it is not already running, or uses the already-activated instance of the component if already running.

Thus, applications are programmed as if there is one instance of any component at all times, which is built into the programming model and the distributed runtime. If a component is invoked by an application, the runtime system finds the activation of the component if it exists (possibly in another server cluster) or creates an activation of the component if the activation does not exist.

However, when dealing with multiple computing clusters, different clusters may try to create the same component at the same time, that is, a race condition exists. Further, clusters may become partitioned from one another, such as by a failure of a communications link between the clusters. In such situations, the concept of individually addressable single-activation virtualized software components becomes uncertain.

Described herein is a technology including one suitable example protocol that handles race conditions as well as partitioned clusters. For example, server clusters can become partitioned from one another due to a failure of the communication link between them, which tends to be more prevalent with server clusters running in different datacenters, particularly with those separated by a relatively large geographic distance. Notwithstanding, different server clusters that are relatively near one another, including clusters running in the same datacenter, can also become partitioned from one another.

In the event that clusters are partitioned from one another, the distributed system continues to operate, but the concept of having only a single component activated in the entire distributed system may be overly limiting. For example, an application may ask to use (the runtime will activate if needed) a component instance that may be running on a partitioned cluster, and the cluster runtime being asked has no way to communicate with the other, partitioned cluster.

Described herein are various operating modes, which are generally directed towards consistency versus availability of a component. For example, in a high-consistency mode, the system ensures there is at most one activation of a component across the clusters. To this end, should any cluster become partitioned, no new activation of a component is allowed to occur until the clusters are again communicating.

In another mode, e.g., a high availability mode, if a cluster cannot access a component's activation, then that cluster can create an instance of the component, even though another activation of the component may already exist (or later be created) on another partitioned cluster. Reconciliation of the component instances, e.g., their states, is performed when the partitioned clusters are again communicating.

Note that the above operating modes, as well as others, may be on a per-component basis, or per-component type basis. For example, a component Y may be specified (e.g., by an administrator) to run in the high-consistency mode, while a component Z may be specified to be allowed to run in the high-availability mode.

Other modes are feasible, some of which are exemplified herein. As one example, if one or more clusters become partitioned, one of the clusters that is deemed (and known by the others) to be part of a quorum, e.g., by a majority of clusters (or by ownership or the like of a quorum resource or any other suitable ownership/reservation mechanism), may create a new instance of a component. The other cluster or clusters that do not have a quorum and are partitioned from the cluster that has the quorum cannot create a new instance of any component.

Yet another mode allows for activation of a component that exists only for that cluster. As one example, a cluster may optimistically create an instance of a component if it knows (or it is highly likely) that no other cluster will need to create another instance. As a more particular example, if a cluster needs to activate a component comprising a video game, and the game players are also within the cluster, then the component may be activated independent of any other clusters, whether partitioned or not. Other clusters can also have their own independent instance of the component.

Still further, at least some of the modes may be combined to an extent. For example, in the video game example, multiple clusters may optimistically create their own independent instance of the game component if most players (but not necessarily all) are in the cluster, or possibly in different clusters but in the same datacenter. A cluster may also optimistically create a component instance even before having heard back from any or all other clusters if it is deemed likely (e.g., from prior usage patterns) that no other cluster is likely to have already created that component. Other optimistic versus pessimistic scenarios are feasible, e.g., optimistically create a component instance if more than half of the other clusters have responded, or some other configurable threshold percentage.

It should be understood that any of the examples herein are non-limiting. For example, components are not limited to any particular distributed system. For another, cluster generally refers to two or more servers that operate in conjunction with one another, so that in the event of any server and/or intra-cluster communication failures, the surviving server or set of servers takes over the failed/non-communicating server's applications. Thus, as used herein, a "cluster" includes even a single surviving server. A cluster also includes the concept of virtual machines that act as different servers even if running on the same physical machine.

Further, "component" refers to any software component/software object/actor that has properties that may benefit from the technology described herein. As such, the present invention is not limited to any particular implementations, aspects, concepts, structures, functionalities or examples described herein. Rather, any of the implementations, aspects, concepts, structures, functionalities or examples described herein are non-limiting, and the present invention may be used in various ways that provide benefits and advantages in programming, computing systems, datacenters and distributed computing systems in general.

FIG. 1 shows a multi-cluster configuration comprising clusters 102(1)-102(n). As represented by the "X" in the communication link, clusters 102(1)-102(3) are partitioned from clusters 102(4)-102(n). Note that for purposes of illustration, two datacenters A and M are shown, (whereby the partition may result from a failure in the wide area network connection between datacenters) however as will be understood, datacenters are not necessary, but if present, any practical number may be connected.

As shown in one server cluster 102(1), but as is understood applies to the other clusters, one or more applications 104 can request usage or activation of a component via a runtime 106. The technology may use a (e.g., consensus) protocol P for clusters to track which activations exist and at which cluster each activation resides, with the tracking data represented in FIG. 1 as component activation data 108. The protocol P is implemented in the runtime 106, comprising a system running on server processor/memory that supports a multi-cluster, single-activation component abstraction as described herein.

In general, if a component exists in the system, the component has an always-addressable identity in the component space, whether in an activated state or deactivated state. As a result, an application may send an operation (task) to the component, and components may communicate with one another regardless of their actual current state. If a component is in a deactivated state and is sent a communication, e.g., an operation request and/or a message, (as the activated or deactivated state of the component is unknown to the sender), the runtime may take care of preserving any such operation requests and communications until the component can be activated and provided with the operation request(s) and/or communication(s). Alternatively an attempt by a calling component to obtain a reference to a deactivated component may cause the deactivated component to be activated, after which the calling component may send an operation or message to the other component. Note that there may be rare exceptions to the concept of an "always" addressable and "always" existing component, e.g., the runtime may be programmed to intentionally ignore a request directed to a certain component(s)/an administrator can intentionally remove a certain component(s) from memory and persistent storage. Thus, as used herein, "always" addressable or "always" exists "means always or substantially always" to account for any such exceptions.

In this example, consider that the component activation does not currently exist on clusters 102(1)-102(3), as known via the component activation data 108 maintained thereon or otherwise accessible thereto, e.g., as a replicated database. However, there is no way to communicate with clusters 102(4)-102(n), one of which may be attempting to create its own instance before the partition heals.

In this situation, the runtime may access policy/rules 110 to determine what action to take. That is, as described above, one of various possible operating modes may be used with respect to the requested component, e.g., as specified in the policy/rules 110.

To provide high availability in the presence of network partitions, the system allows the possibility of two or more activations to exist when clusters are unable to communicate. Therefore, if as in FIG. 1, the cluster 102(1) is unable to communicate with at least one of the other clusters, to attain high availability the runtime 106, based on the policy/rules 110, may allow the cluster 102(1) to activate a component that it cannot access. The runtime notes that this activation is a possible-duplicate as described below, e.g., by associating the activation with a "DOUBTFUL" state.

Figure 2:
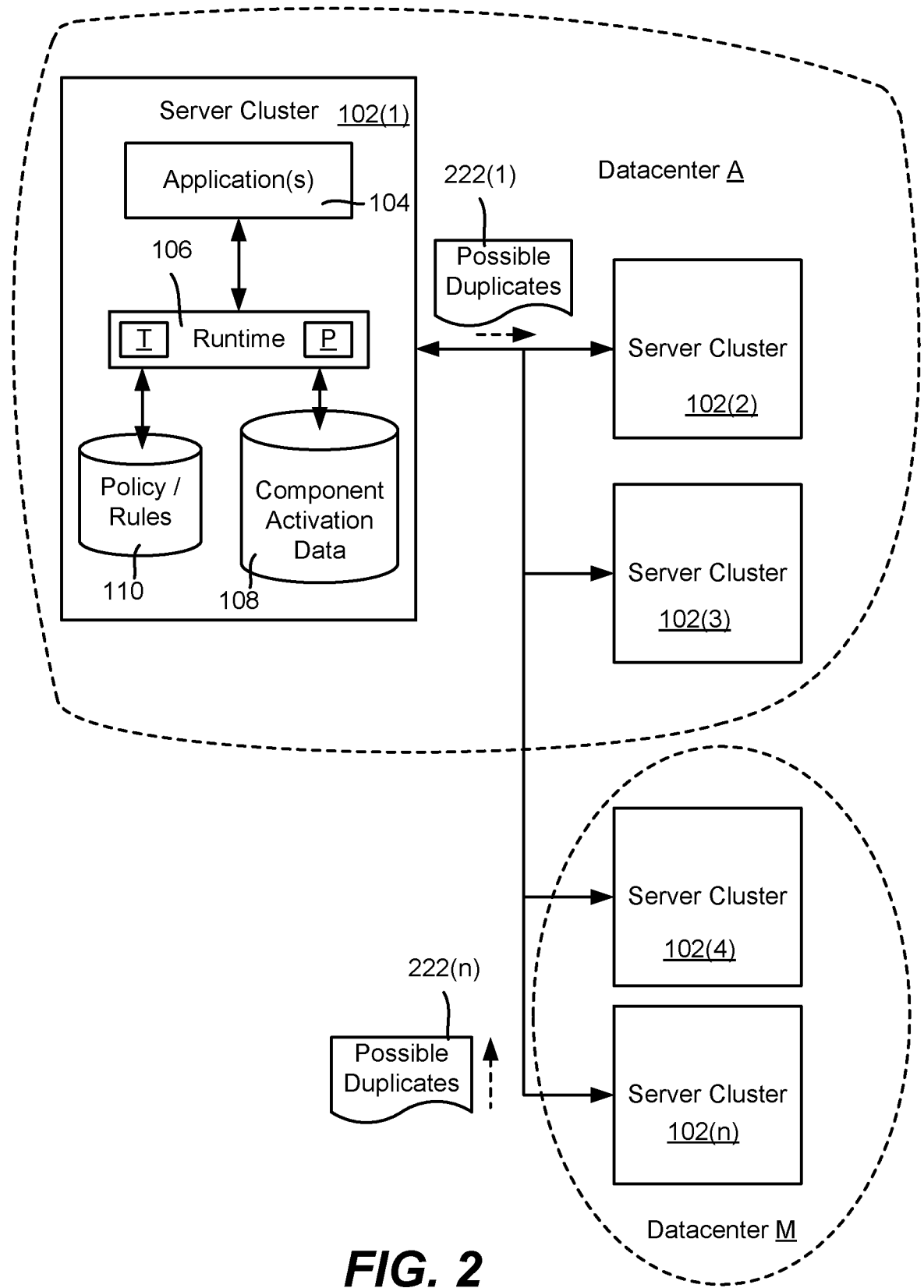
FIG. 2 is a block diagram representing example components of a distributed computing system having no longer partitioned clusters that may be used in providing and managing components, according to one or more example implementations.

When communication is restored, as represented in FIG. 2, the system reestablishes component consistency by having clusters exchange lists or other data structures (e.g., 222(1) and 222(n) are shown, although each cluster sends its own list) of possible duplicate component activations. If an activation has in fact been duplicated, then the protocol that reestablishes consistency by retaining only one surviving activation and notifying the other activation or activations that they are duplicates. Any duplicate activations are killed, which typically includes first persisting state. The application (e.g., 104) is responsible for merging any state of the other activation or activations into the surviving activation.

As described herein, in one high-consistency mode, the consistency problem may be prevented altogether by not allowing the activation for any given component (or possibly for any component at all). In a less-restrictive but still consistent mode, a rule may specify that one set of clusters is allowed to create the activation (for a specified component or type, or possibly for any activation at all), but only if the creating cluster is part of a quorum of clusters. Availability still suffers because clusters that are not part of the quorum are not allowed to create new activations.

Note however that some applications, such as a geo-distributed user-facing application, e.g., for games and social networks, client connections are usually localized to the datacenter nearest to them. In many cases, interactions are with users in the same geography. Thus, the probability of multiple activations of a user/session component is reduced. In this instance, a non-quorum partition cluster may create activations despite the possibility of a duplicate.

Figure 3:
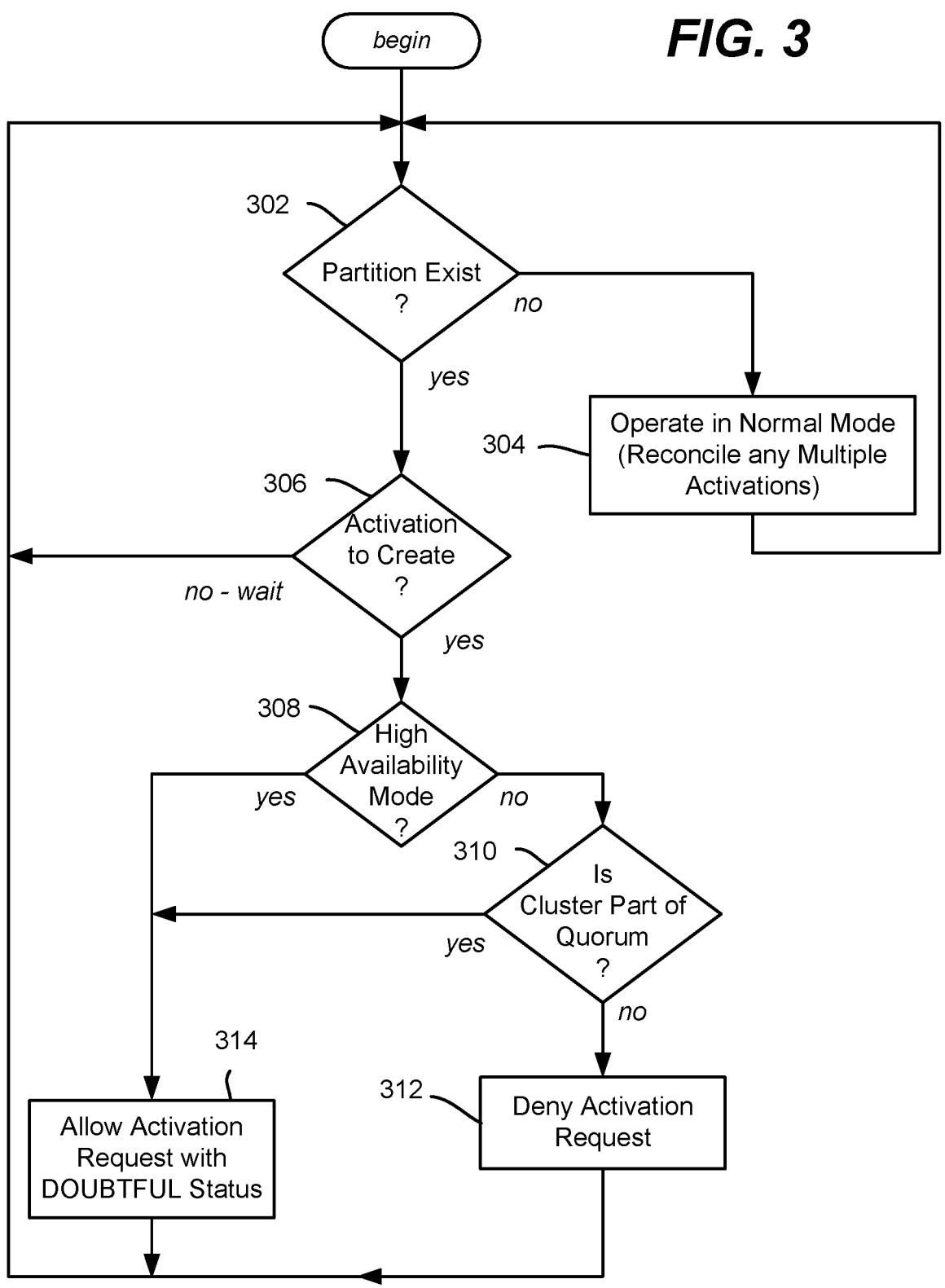
FIG. 3 is a flow diagram having example steps that may be taken to provide different operating modes with respect to component activation, according to one or more example implementations.

FIG. 3 is a simplified example flow diagram that summarizes some of the above concepts. If at step 302 no partition exists, then the system operates in a normal mode, in which only one activation is allowed at a time (although there may be temporary exceptions as described below, such as when the runtime optimistically creates an activation on the likelihood that it is the only one and thereafter checks whether another activation exists).

If there is a partition, e.g., the runtime running the protocol belongs to an active cluster that is a proper subset of the total multi-cluster, step 302 instead branches to step 306, which operates when an activation needs to be created in response to an application request. Note that if an activation already is instantiated (activated) in the active cluster, the runtime simply uses that activation and returns information to the application so the application will use the existing activation instance.

As set forth above, if a component (whether specifically identified or by being of a certain class/type) is allowed to be created (possibly as a duplicate) in the high availability mode, step 308 branches to step 314 where the activation is created, but with a DOUBTFUL status to indicate it is a possible duplicate.

Conversely, if an activation is only allowed to be created in the high consistency mode but a partition exists, then step 308 branches to step 310, which evaluates whether the cluster is part of the quorum. If not, the activation request is denied at step 312. Note that in the alternative, most restrictive high consistency scenario, step 310 may be bypassed, that is, the request is denied as represented by step 312 regardless as to whether a cluster is part of the quorum.

As can be appreciated, a given component may be allowed to be used in the high-availability mode, another component in the high-consistency mode (regardless of quorum) while yet another component may be in the high-consistency mode (dependent on quorum membership). As one example, if there is no practical way to reconcile (recover) one component's state with a duplicate, such a component may need to be activated only in the high-consistency mode. Another component may have duplicates that are reconcilable, in which event that component may be a good candidate for the high-availability mode.

As can be readily appreciated, the protocol P entails runtime expense, generally communication delays. This expense can be avoided for components that are known statically (e.g., at application compile-time) to be accessible only within the cluster (or possibly the datacenter of clusters) that activated them. For example, a component that represents a game instance may only be accessible to player components that reside in the same datacenter as the game instance. In this situation, there is no need to notify the clusters in other datacenters about the activation of the game instance. To avoid this notification, the class definition for the game component may be annotated with a keyword, for example, that tells the system not to run the protocol when components of that class need to be activated.

The distributed system thus provides a programming model and supporting distributed computing runtime that treats components as virtual entities rather than physical entities. As will be understood, among other benefits this significantly simplifies component management from the programmer's perspective, while providing scalability and reliability. Note that as used herein, "components" refers to other distributed components, objects or actors that are similar in nature.

For instance, a "virtualized distributed component" (or more simply "component") as described herein has an existence that is independent of the lifetime of any of its in-memory instantiations, and thus independent of the lifetime of any particular server. If there is no in-memory instance of a component, a message sent to the component automatically may cause a new instance to be created on an available server (e.g., by the runtime or another component, such as the sender), which may be any available server, for example. The runtime thus gives the developer a virtual "component space" that allows invoking any possible component in the system as if it were present in memory. Thus, components never fail, even if a server crashes, and components do not need to be supervised and/or explicitly recreated by an application.

As can be readily appreciated, application code thus may be written in an optimistic style with the assumption that all legitimate requests will be served by the corresponding components. This removes the need to write application code that checks for existence of the component and to create the component if not found, which significantly simplifies the application logic and reduces the amount of code a developer needs to write.

Figure 4:
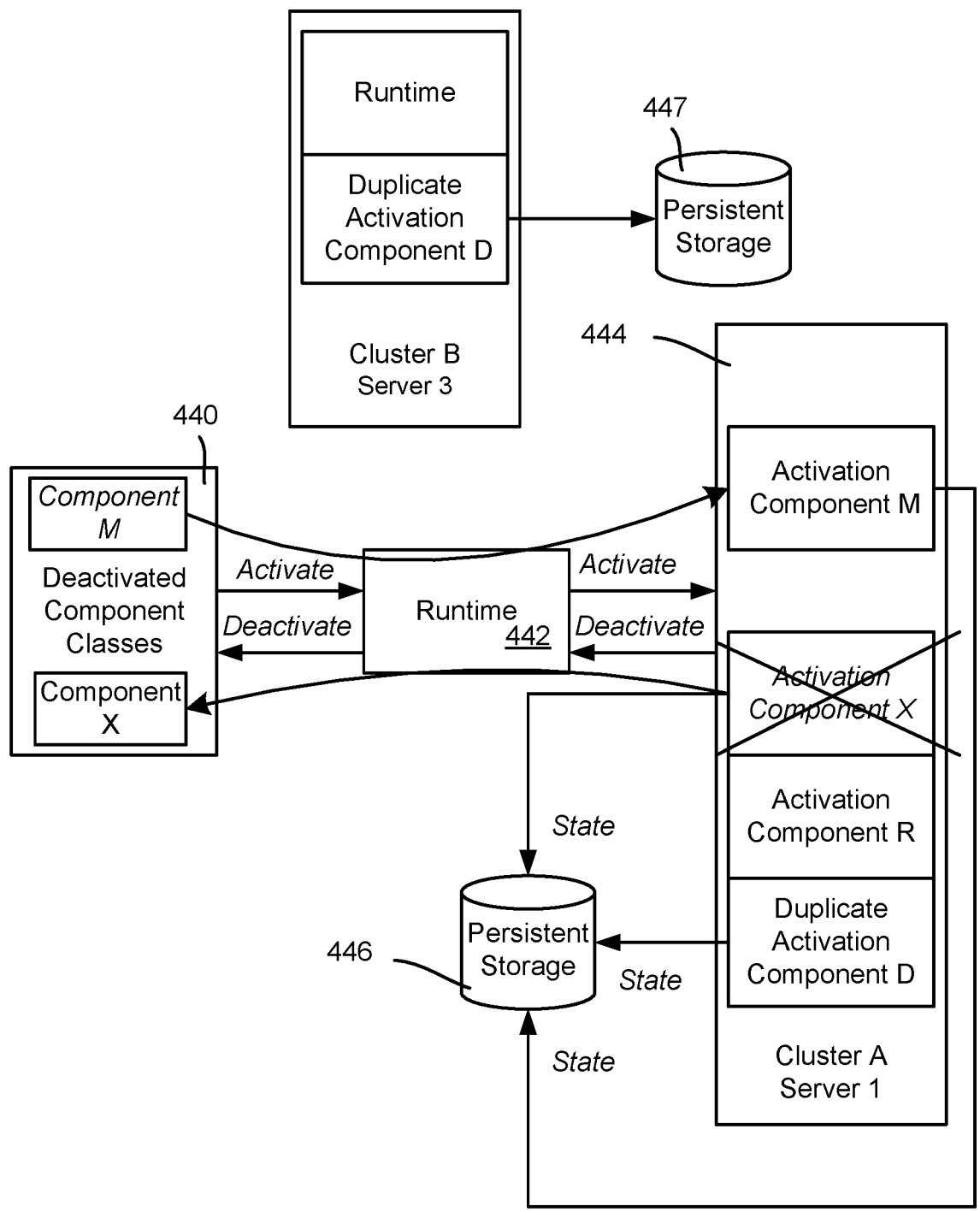
FIG. 4 is a block diagram representing examples of activation and deactivation of components, as well as duplicate components in partitioned clusters, according to one or more example implementations.

By way of example, FIG. 4 summarizes activation, deactivation and persisting state of components in one or more implementations. A deactivated component among classes 440 is activated by the runtime 442 into server memory 444 of a selected server of a cluster, e.g., an activation of component M may be activated from a deactivation as needed. Once activated, the activated component M may recall state and store state from/to persistent storage 446, if any, as desired. Note that the persistent storage 446 may be accessible regardless of the physical server on which a component is currently activated, e.g., via centralized and/or replicated storage, for example, which may be on a per-cluster basis. Alternatively however, state may be read from/stored to many different kinds of media, e.g., mobile phones, consoles, cloud storage services, and so forth. Such storage nay not always be accessible, e.g., devices like phones/consoles; however it is likely that components that depend on access to devices are only needed when the device is accessible.

As also shown in FIG. 4, an activated component X is deactivated by the runtime 442 based upon one or more deactivation criteria, such as based upon (lack of) usage, e.g., when not having performed any work for some time.

Note that a component may also be allowed to deactivate itself, e.g., by calling a deactivate function. At any time, and as part of deactivation before deactivation completes, the component X may persist state to the persistent storage 446, if any, as desired. The component X is then deactivated.

FIG. 4 also shows a duplicated activation D of a component, e.g., servers on two partitioned clusters A and B, which each have their own instance of component activation D. Each runtime allows state to be persisted, but in this situation, the clusters cannot communicate, and thus state reconciliation will need to be performed when the clusters are again communicating, with only one activation instance surviving, as described herein. Note that in this example, storage is centralized on a per-cluster basis.

As is understood, the runtime activates components when needed by an application or another component. Thus, because applications are able to address components at any time and have no concept of the activated or deactivated state of a component, for purposes of simplicity and explanation herein, a component can be considered an "activation" or "activated" even if temporarily in the deactivated state.

As will be understood, described herein is a technology that provides support for applications that span multiple clusters. In particular, programmers need not explicitly specify the cluster in which a component has to be activated. One or more implementations, therefore, allow unmodified applications to be geo-distributed.

In a geo-distributed setting, components are distributed across multiple clusters. However, it is unlikely that each component in the system will be invoked by a request from every cluster. Invocations of a particular component may be restricted to one of two access patterns, including locally referenced components or globally referenced components.

For example, many components are only likely to be referenced from within a single cluster. This access pattern occurs naturally in several application scenarios. For instance, in the context of a multi-player gaming scenario, a game often has its players logged into the same cluster or set of clusters in the same datacenter.

Globally referenced components allow for components to be referenced from any cluster. For example, globally referenced components may contain aggregated information, such as global leaderboards or a publicly accessible summary of a user's gaming profile.

Turning to one suitable activation creation protocol, for clarity each cluster may be considered as if it were a single node; described herein are messages that may need to be exchanged between clusters. In one or more implementations, a geo-distributed component directory protocol P is based at least in part upon the above-described component access patterns.

Figure 5:
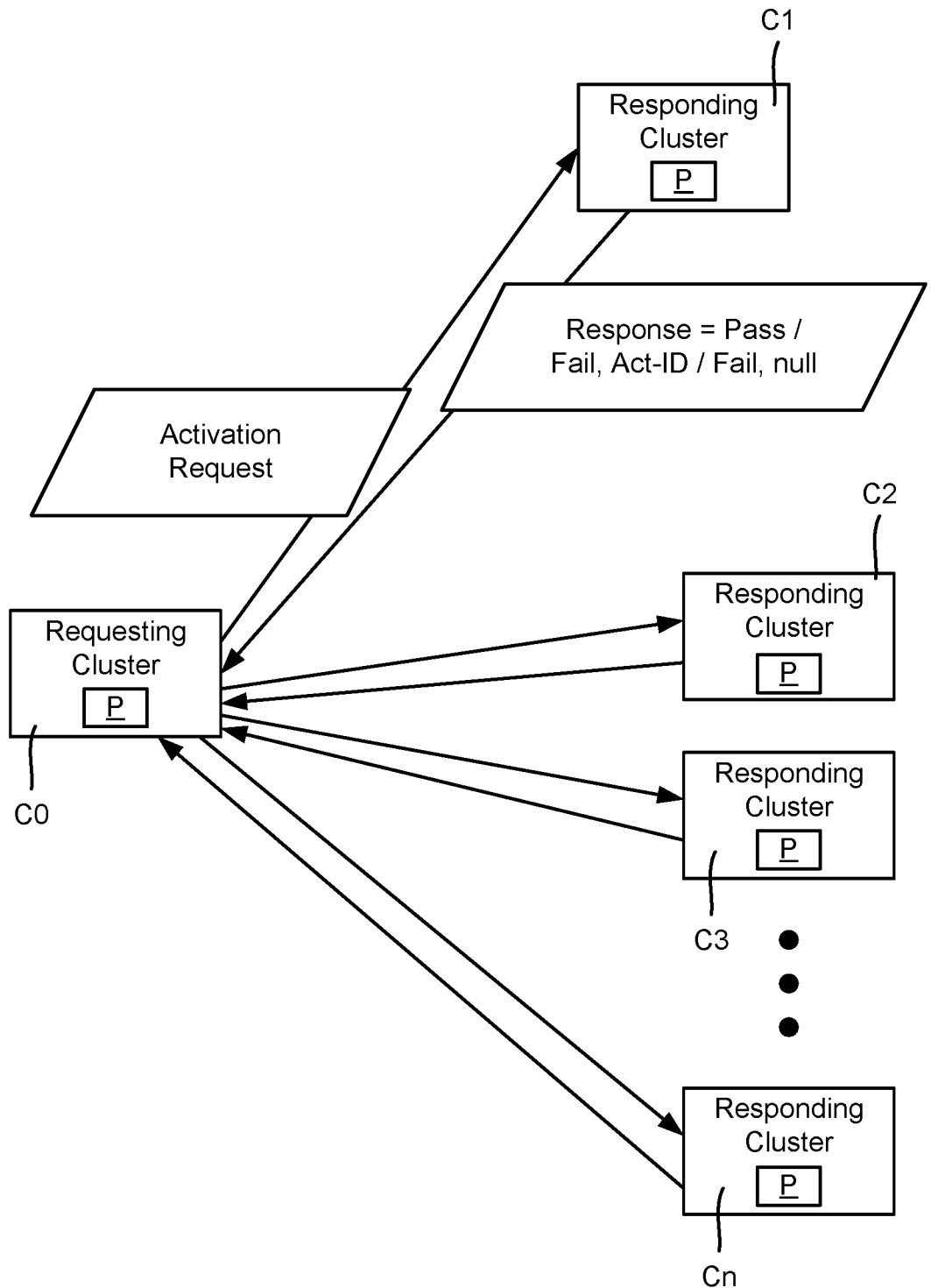
FIG. 5 is a block diagram representing a component activation request and response being communicated between clusters, according to one or more example implementations.

As represented in FIG. 5, when a cluster, C0, needs to activate a component V, C0 asks each cluster with which it can communicate, e.g., clusters C1-Cn, whether that cluster has already activated the component. To this end, described is a request/response portion of the protocol P, running on each cluster. If there exists a cluster that has already activated the component, then C0 uses that activation. If no other cluster C1-Cn with which cluster C0 can communicate has created the activation, then cluster C0 creates the activation locally.

The technology described herein needs to handle race conditions, e.g., when C0 tries to invoke a component V for the first time, it asks each cluster with which it can communicate about V's activation; this prevents C0 from creating a duplicate activation of V. However, if another cluster, C1, is concurrently trying to invoke V for the first time, then C0 and C1 may otherwise each create a distinct activation for V. The protocol P avoids this race condition scenario, as described below.

The technology described herein also needs to deal with partitions, that is, when not all clusters can communicate with one another. For example, as cluster C0 can only ask clusters with which it can communicate about component V, if there exists any cluster that is partitioned from cluster C0, then one or more of them may already have activated V. These activations in partitioned clusters are unknown to cluster C0, so as described herein, in certain situations, cluster C0 may activate V despite these activations' existence.

Figure 6:
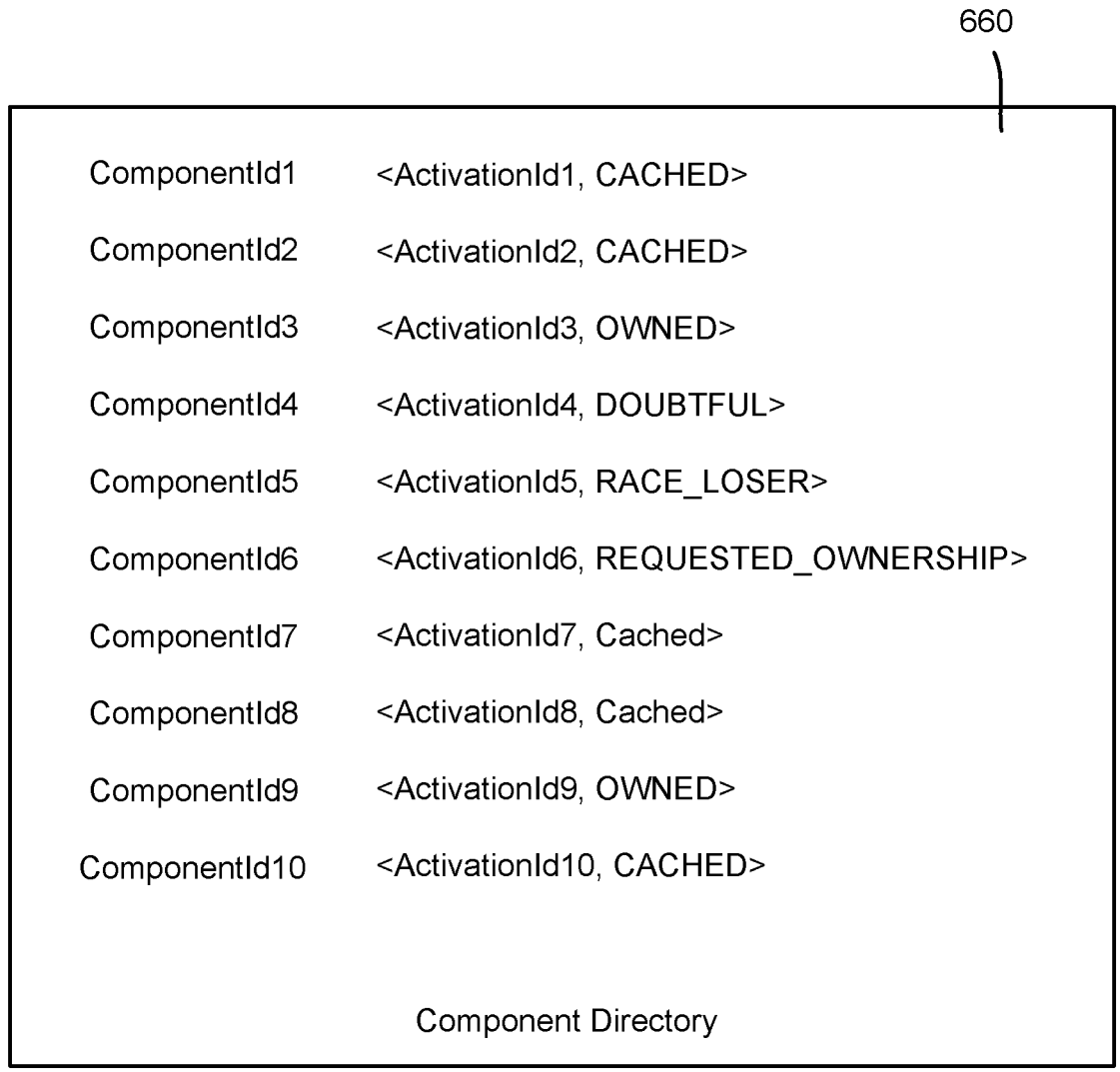
FIG. 6 is a representation of data maintained by a cluster (or an individual server of the cluster), which includes activation state data for components, according to one or more example implementations.

One solution to the partitioning problem is to use a consistent component creation strategy, which disallows the creation of components in the presence of partitions. Another somewhat less-restrictive solution is to only allow the clusters that can communicate and have a quorum to create components in the presence of partitions. However, there exists a significant chance of partitions, particularly in wide area networks, therefore, such strategies may render the system or possibly a large portion of the system unavailable to the creation of new components As exemplified in FIG. 6, each cluster has a component directory 660 generally including a dictionary that maps a VirtualComponentId to a tuple of type <ActivationId, ActivationState>; where VirtualComponentId is the identifier of the component, ActivationId is the identifier of the component's activation, and ActivationState. As generally represented in FIG. 6, ActivationState can take one of five values:

- OWNED: An activation is in state OWNED if it was created in the absence of partitions. That is, when created, the creating cluster's active multi-cluster was equal to the total multi-cluster.
- DOUBTFUL: An activation is in state DOUBTFUL if it was created in the presence of one or more partitions between the creating cluster and other clusters. That is, when activated, the creating cluster's active multi-cluster was a proper subset of the total multi-cluster. If an activation of component V is DOUBTFUL, then it may have been created despite the existence of another activation outside the creating cluster's active multi-cluster.
- REQUESTED_OWNERSHIP: An activation of component V is in state REQUESTED_OWNERSHIP if the cluster in which this activation exists is in the process of asking other clusters in its active multi-cluster about other activations of V.
- RACE_LOSER: An activation, A0, of component V in cluster C0 is in state RACE_LOSER if C0 lost a race condition with another cluster, e.g., C1, trying to concurrently activate A1.
- CACHED: An activation is CACHED if it is a reference to an activation in a remote cluster.

Figure 7:
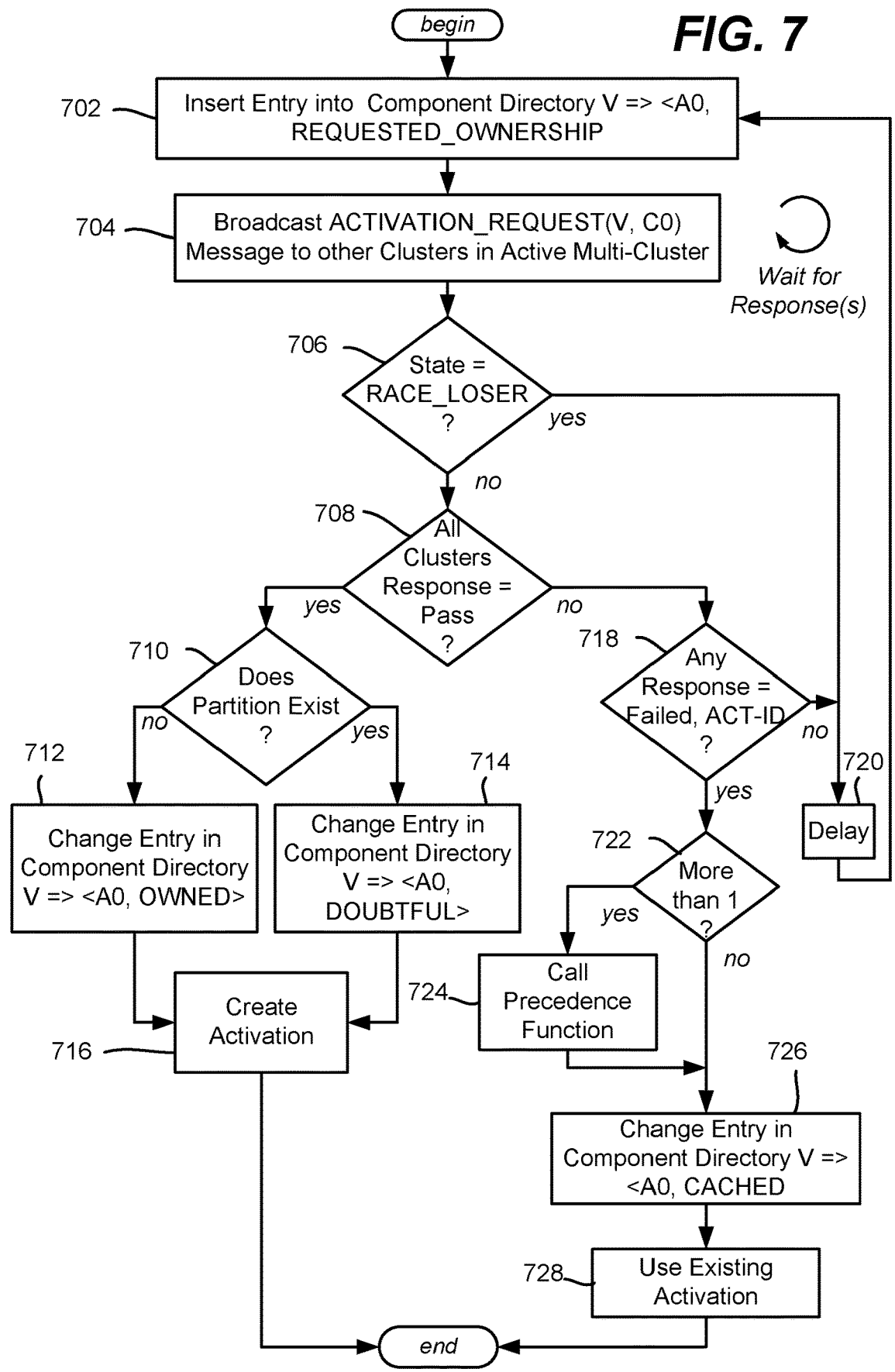
FIG. 7 is a flow diagram having example steps that may be taken to send an activation request and process the response into an action, according to one or more example implementations.

Turning to how the technology described herein handles race conditions, by way of example, consider that a cluster C0 wants to create an activation, A0, for component V. As represented at step 702 of FIG. 7, C0 first inserts an entry in its component directory V=> <A0, REQUESTED_OWNERSHIP>. C0 then broadcasts (e.g., FIG. 5 and step 704 of FIG. 7) a message of type ACTIVATION_REQUEST(V, C0) to the clusters in its active multi-cluster, where V is the VirtualComponentId of the component that C0 is trying to activate.

Figure 8:
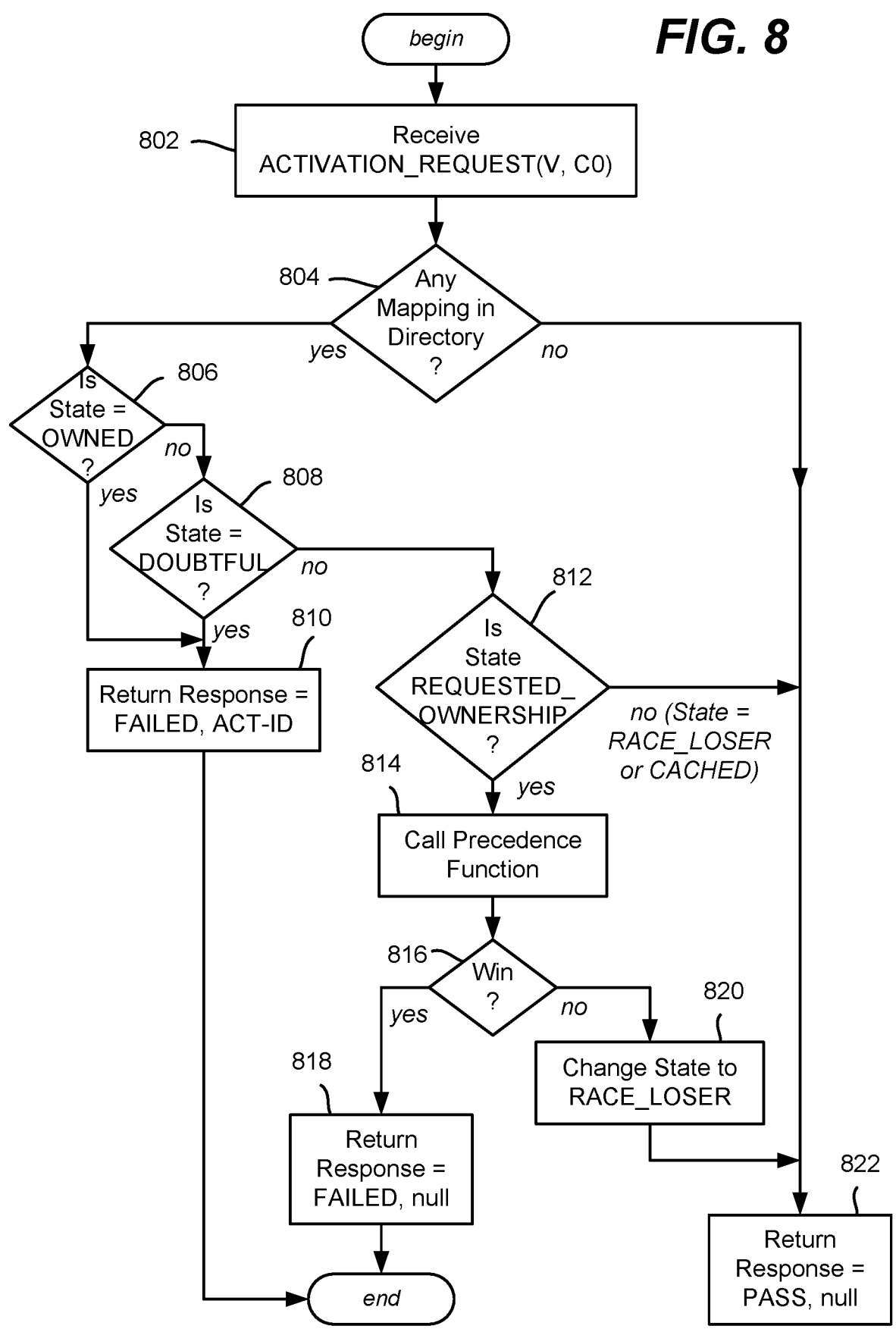
FIG. 8 is a flow diagram having example steps that may be taken upon receiving an activation request and outputting a response, according to one or more example implementations.

When another cluster, e.g., cluster C1, receives an ACTIVATION_REQUEST(V, C0) message, cluster C1 checks its component directory for a mapping corresponding to component V. The responding cluster runs a response part of the protocol P, as generally represented in FIG. 8, where step 802 represents receiving the request.

If cluster C1's component directory does not contain a mapping for the component V, as evaluated at step 804, the cluster C1 returns ACTIVATION_RESPONSE(PASS, null) at step 822. Cluster C1 does not make any changes to its component directory.

If C1's component directory contains a mapping for the component V, the mapping may be in one of the five ActivationStates described above. The actions taken by C1 are based on the ActivationState of the activation in its component directory.

Step 806 evaluates whether C1 contains V=> <A1, OWNED> in its component directory, where A1 is an activation created by C1 for component V. In this case, C1 has already created an activation for component V. Thus, cluster C1 responds to cluster C0 that it already owns an activation of component V by sending the cluster a C0 ACTIVATION_RESPONSE(FAILED, A1) message at step 810, where A1 represents the activation ID.

If not owned, step 808 evaluates whether cluster C1 contains V=> <A1, DOUBTFUL> in its component directory. This case is similar to the case in which C1 contains an activation in state OWNED. In this situation, C1 has an activation (A1) for component V, but C1's active multi-cluster was a subset of the total multi-cluster when C1 created activation A1. If doubtful, the cluster C1 similarly responds with ACTIVATION_RESPONSE(FAILED, A1) at step 810.

If the state is neither owned nor doubtful, step 812 evaluates whether cluster C1 contains V=> <A1, REQUESTED_OWNERSHIP> in C1's component directory. In this case, C0 and C1 are both racing to activate component V; recall via step 702 of FIG. 7 that prior to sending out an ACTIVATION_REQUEST message, C0 inserted an entry V=> <A0, REQUESTED_OWNERSHIP> in its component directory. Also note that because C1 is also requesting ownership, C0 is similarly running the response portion of the protocol as exemplified in FIG. 8.

After receiving an ACTIVATION_REQUEST message from cluster C0, and C1'state is REQUESTED_OWNERSHIP for this component, C1 needs to decide whether it wins or loses the race condition. A tiebreaking mechanism T e.g., built into policy/rules 110 and exemplified herein as a deterministic precedence function, prec_func, may be used (step 814) to decide which cluster wins the race condition. Note that cluster C0 is or will be similarly running the precedence function.

In one or more implementations, the function prec_func takes two arguments, first, a VirtualComponentId, V, and second, a ClusterId C. For a given component V, prec_func (V, C) defines a total order over all C; for a given pair of distinct clusters C and C', either prec_func(V, C) is less than prec_func(V, C') or prec_func(V, C) is greater than prec_func(V, C').

If prec_func(V, C1) is greater than prec_func(V, C0), then C1 wins the race condition (step 816), and sends ACTIVATION_RESPONSE(FAILED, null) at step 818. Conversely, if prec_func(V, C1) is less than prec_func(V, C0), then C1 performs two steps: at step 820 cluster C1 changes the state of its component directory entry corresponding to V to V=> <A1, RACE_LOSER>, and at step 822, cluster C1 sends cluster C0 ACTIVATION_RESPONSE(PASS, null).

If the state is not REQUESTED_OWNERSHIP at step 812, C1 may contain V=> <A1, RACE_LOSER> or V=>

<A', CACHED> in its component directory. Note that in this implementation, these are the only two remaining possible states (CACHED means that C1 contains a reference to an activation A' of V which is owned by another cluster C'). In either case, C1 responds with ACTIVATION_RESPONSE (PASS, null) at step 822.

Returning to FIG. 7, on receiving an ACTIVATION_RESPONSE from every cluster in its active multi-cluster, cluster C0's entry for component V is either in state REQUESTED_OWNERSHIP or RACE_LOSER (because cluster C0 may have similarly performed steps 814, 816 and 820 based upon C1's request for ownership).

If C0's entry for V is in state RACE_LOSER as evaluated at step 706, then another cluster won the race. C0 delays for a short time (step 720), sets its state to REQUESTED_OWNERSHIP, and reruns the protocol by sending an ACTIVATION_REQUEST message to each cluster in its active multi-cluster. Note that cluster C0 delays in order to allow the cluster that won the race condition to take ownership of the component.

If C0's component directory for component V is in state REQUESTED_OWNERSHIP, then C0 takes the following steps based on the ACTIVATION_RESPONSE messages it sees from the clusters in its active multi-cluster.

If C0 receives ACTIVATION_RESPONSE(PASS, null) from all other clusters in its active multi-cluster (step 708), and C0's active multi-cluster is the total multi-cluster as well (that is, no partition exists at step 710), then C0 changes its component directory entry from V=> <A0, REQUESTED_OWNERSHIP> to V=> <A0, OWNED> at step 712. If C0's active multi-cluster is not equal to the total multi-cluster, that is, a partition exists, then C0 changes its component directory entry to V=> <A0, DOUBTFUL>. The activation then occurs as represented by step 716.

If cluster C0 receives ACTIVATION_RESPONSE (FAILED, A') from at least one of the clusters in its active multi-cluster, then step 718 branches to step 722 where the cluster changes its component directory entry to V=> <A0, CACHED> as represented by step 726. Note that the activation ID A' was returned via step 810 performed on the cluster that activated the activation, whether in the OWNED or DOUBTFUL state. If cluster C0 receives more than one such response (step 722), cluster C0 uses prec_func (step 724) to decide on which activation to cache in its component directory at step 726. Cluster C0 then uses the existing activation as represented by step 728.

Returning to step 718, if cluster C0 receives no FAILED ACTIVATION_RESPONSE messages with a non-null A', but at least one ACTIVATION_RESPONSE(FAILED, null), cluster C0 re-runs the protocol by sending ACTIVATION_REQUEST messages to each cluster in its active multi-cluster. This may include a delay, as represented by step 720.

A cluster may broadcast to other clusters activation announcements of components it recently activated, e.g., following step 716. In one implementation, classes may be annotated by ClusterLocal or ClusterShared, such that only activations of components of ClusterShared classes need be broadcast, for example. These may be set to state "CACHED" in the other clusters' component directories.

Figure 9:
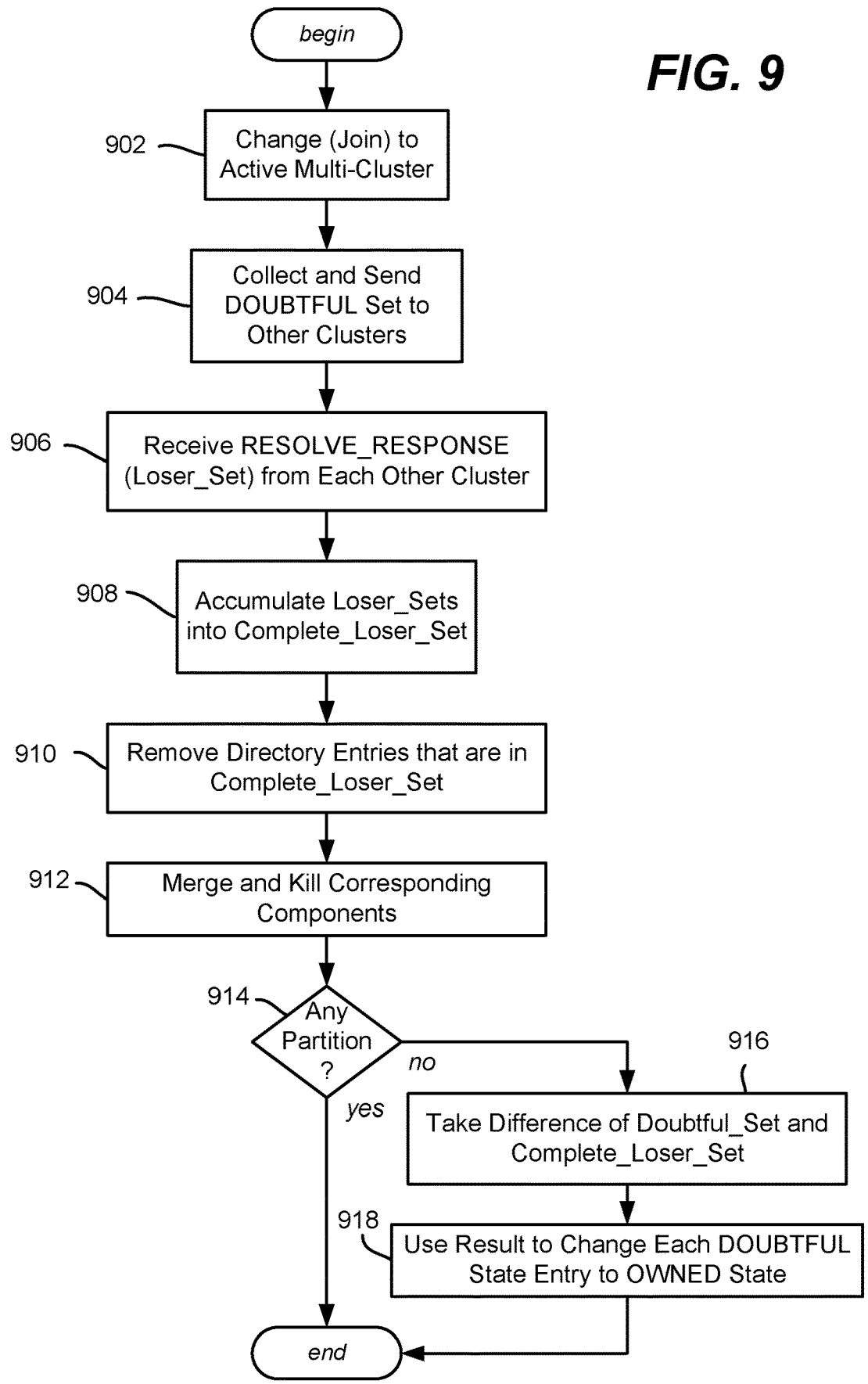
FIG. 9 is a flow diagram having example steps that may be taken upon clusters being no longer partitioned to recover from the partitioning by sending sets of possible duplicates to other clusters and processing the response to remove any duplicates that are selected to not survive, according to one or more example implementations.
Figure 10:
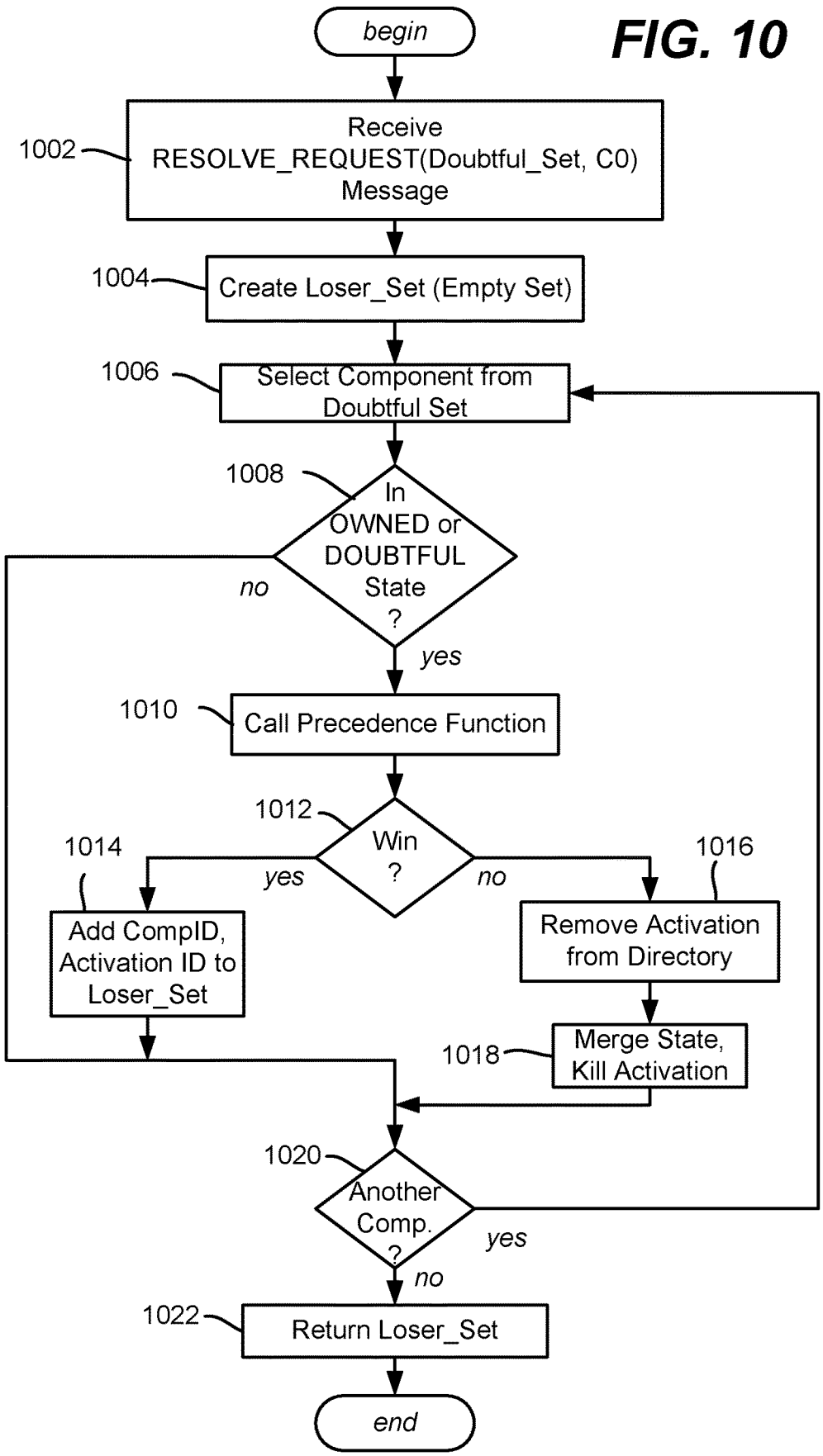
FIG. 10 is a flow diagram having example steps that may be taken upon receiving and processing a set of possible duplicates to determine whether any duplicates exist and if so to determine which ones survive, and outputting a response, according to one or more example implementations.

With respect to detecting multiple activations of a component, consider that a cluster, C0, creates a DOUBTFUL activation after running the protocol described herein when the active multi-cluster is a subset of the total multi-cluster. C0 cannot communicate with clusters that do not belong to its active multi-cluster because of a partition. These partitioned clusters may have already created an activation of the component. When an activation is created in state DOUBTFUL, when the partition later heals, a check as to whether there exists one or more duplicate activations is performed. FIGS. 9 and 10 are directed towards dealing with any multiple activations.

If one or more duplicate activations exist, one activation is classified as the "winner" activation, and the rest as "loser" activations. The state of each loser activation is merged with that of the winner activation, and the loser activation is then removed.

This portion of the protocol runs whenever a cluster's active multi-cluster changes, (that is, a cluster joins), as generally represented at step 902 of FIG. 9. A change to the active multi-cluster may be decided using a consensus protocol. Thus, each cluster in the new active multi-cluster runs the protocol and/or when one or more clusters join the active multi-cluster. If one or more clusters drop out and no clusters join, there is no point in running the protocol.

As represented at step 904, when cluster C0's active multi-cluster changes, cluster C0 collects any activations in state DOUBTFUL, and sends a RESOLVE_REQUEST (Doubtful_Set, C0) to the other clusters in its active multi-cluster. Doubtful_Set is the set of DOUBTFUL activations created by C0, as generally represented by the communication of the possible duplicate lists 222(1) and 222(n) in FIG. 2. In one or more implementations, each DOUBTFUL activation in Doubtful_Set is a pair of the form <V, A> where A is an activation of component V.

When a cluster (e.g., C1) receives a RESOLVE_REQUEST(Doubtful_Set, C0) message, as represented at step 1002 of FIG. 10, cluster C1 creates an empty set of activations (step 1004), e.g., named Loser_Set to return to C0. Then for each component <V, A0> in Doubtful_Set, (steps 1006 and 1020), if C1's component directory contains a DOUBTFUL or an OWNED activation A1 as evaluated at step 1008 for component V, then it means C1 and C0 have both created an activation of component V. One is a winner, the other is a loser. In order to decide which is which, a precedence function similar to the one described above may be used, as represented via steps 1010 and 1012. If prec_func(V, C1) is greater than prec_func(V, C0), C1 wins and adds <V, A0> to Loser_Set at step 1014. If prec_func(V, C1) is less than prec_func(V, C0), C1 removes A1 from its component directory (step 1016) and kills the activation at step 1018 (after merging the state or at least persisting it for later merging). Once C1 has finished processing all <V, A0> pairs in the Doubtful_Set, step 1020 branches to step 1022 where cluster C1 sends cluster C0 a RESOLVE_RESPONSE(Loser_Set) message.

Returning to FIG. 9, step 906, when C0 receives a RESOLVE_RESPONSE(Loser_Set$_i$) from every cluster, C$_i$, in its active multi-cluster, C0 accumulates Loser_Set$_i$ into Complete_Loser_Set (step 908). C0 removes all activations in Complete_Loser_Set from its component directory (step 910). Step 912 represents merging and killing those losing duplicates.

Note that a cluster C$_i$ does not add a DOUBTFUL activation of component V to Loser_Set$_i$ if C$_i$ never created an activation for V, or if C$_i$ created an activation for V, but C0 took precedence over C$_i$, and, as a consequence, C$_i$ removed V from its component directory. If the new active multi-cluster is equal to the total multi-cluster (no partition exists at step 914), then C0 has contacted every cluster in the system about all its DOUBTFUL components. If none of the clusters adds an activation of component V to Loser_Set$_i$, then C0's activation state is converted to state OWNED; either no cluster created an activation for V, or C0 takes precedence over all other clusters that created an activation for V. C0, therefore, takes the difference of Doubtful_Set and Complete_Loser_Set (step 916), and changes the state of every activation in the difference to OWNED (step 918).

Turning towards aspects of individual server operations within a cluster, when creating an activation of a component, the intra-cluster messages between servers of a cluster are adapted to the geo-distributed cluster environment. Consider that there is a server S0c in a cluster C0 that is trying to create an activation A0 for component V. S0c first computes V's consistent hash to find which server of the cluster contains the appropriate directory partition, S0p. If S0p already contains an activation for component V, then it returns the activation to the caller S0c. However, if S0p does not contain an activation for component V, then it runs the activation creation protocol as generally described herein with reference to FIGS. 5, 7 and 8.

With respect to running the duplicate detection phase as generally described with reference to FIGS. 9 and 10, one server, S0g, in cluster C0 may be assigned as a gateway server. A cluster's gateway server gathers the set of DOUBTFUL activations from within the servers of the cluster. S0g broadcasts a message to each server in C0, asking each server for the set of DOUBTFUL activations in its component directory partition. Once the gateway server obtains the set of DOUBTFUL activations from each server, S0g then broadcasts a RESOLVE_REQUEST(Doubtful_Set, C0) message to every other cluster's gateway server, S1g, as generally described above with reference to FIG. 7, step 704.

On receiving a RESOLVE_REQUEST(Doubtful_Set, C0) message from S0g, e.g., at step 1002 of FIG. 10, S1g distributes the set of the set of DOUBTFUL activations to the server in charge of the appropriate component directory partition based on the consistent hash of each activation's VirtualComponentId. The individual servers in cluster C1 resolve activations as described herein. Each server in C1 also returns the set of loser activations to S1g (if the set of remote loser activations is empty, it returns the empty set).

If S1g obtains a set of loser activations from every server in C1, S1g sends S0g the complete set of loser activations with a RESOLVE_RESPONSE(Loser_Set, true) message. If S1g does not obtain the set of loser activations from every server, it sends S0g RESOLVE_RESPONSE(Loser_Set, false). The two cases are distinguished because C0 cannot convert a DOUBTFUL activation, V, to OWNED unless it is certain that every other cluster, C1, has ensured that either it does not contain an activation for V, or it contains an activation for V, but C0 takes precedence according to the prec_func.

When S0g receives a RESOLVE_RESPONSE message from each cluster in its active multi-cluster, it deactivates the set of loser activations. However, S0g only converts the set of activations in Doubtful_Set \Loser_Set to state OWNED if two conditions hold: 1) its active multi-cluster is equal to the total multi-cluster, 2) all messages are of the form RESOLVE_RESPONSE(Loser_Set, true). If one or more received messages are of the form contain RESOLVE_RESPONSE(Loser_Set, false), it does not convert any DOUBTFUL activations to OWNED. If S0g receives a RESOLVE_RESPONSE(Loser_Set, false) message from the gateway server S1g of a remote cluster C1, S0g cannot be sure that all the DOUBTFUL activations in C0 have been analyzed by the appropriate servers in cluster C1.

Note that the above description is only one example, wherein each cluster uses a single, distinguished server as a gateway. However, in alternative implementations, multiple servers may be used for redundancy, and/or the set of DOUBTFUL activations may be divided among several gateway servers.

With respect to cluster membership, if a server S0 in cluster C is trying to create an activation A for component V, S0 first inserts an entry into its component directory of the form V=> <A, REQUESTED_OWNERSHIP>, and then sends an ACTIVATION_REQUEST message to every cluster in its active multi-cluster. If, in the meanwhile, new servers are added to or deleted from cluster C, the range of VirtualComponentId hashes that S0 is responsible for may change. As a consequence, a subset of the data in S0's component directory partition may need to move to another server, S1. The change in the range of VirtualComponentId hashes that S0 is responsible for may occur while S0 is running the activation creation protocol.

A component directory entry for a component V is allowed to move from server S0 to server S1 even when S0 is running the activation creation protocol for component V. When the activation creation protocol is in progress, component directory entries are of the form V=> <A, REQUESTED_OWNERSHIP>, or V=> <A, RACE_LOSER>. When all the clusters respond with ACTIVATION_RESPONSE messages, S0 does not find a component directory entry corresponding to component V (because component directory entries may migrate). At this point, S0 recognizes that the component directory entry has moved to another server, and stops running the activation creation protocol. When the server to which the component directory entries have been migrated, S1, receives a component directory entry of the form V=> <A, REQUESTED_OWNERSHIP>, or V=> <A, RACE_LOSER>, it will run the activation creation protocol anew. In order to run the activation creation protocol, the ActivationState of the component directory entry corresponding to the activation needs to be in state REQUESTED_OWNERSHIP. Because S1 may have received a component directory entry in state RACE_LOSER, S1 needs to first change the state of the activation to REQUESTED_OWNERSHIP; S1 delays in order to allow the cluster that won the race condition to take ownership of the component, and then converts the state of the component directory entry to REQUESTED_OWNERSHIP.

S1 only needs to run the activation creation protocol for component directory entries with ActivationState REQUESTED_OWNERSHIP or RACE_LOSER. Component directory entries whose activation state is DOUBTFUL, OWNED, or CACHED do not require any special handling.

Turning to another aspect, some (likely most) components are only referenced from within a single cluster, that is, the cluster in which the component was activated. In order to ensure that only a single activation of a particular component exists globally, the protocol has the cluster try to create an activation of component V to check whether any other cluster in its active multi-cluster has created an activation for V. If V is a locally referenced component, no cluster other than the creating cluster will reference V. For components that are locally referenced, e.g., V is a locally referenced component, a cluster, C, checks for an activation of V with all the clusters in its active multi-cluster, despite C being the only cluster to ever reference V. The cost of asking every cluster in C's active multi-cluster about V is a single WAN round-trip. The network latency cost of a WAN round-trip is often several orders of magnitude higher than a round-trip between two nodes within a cluster.

In order to avoid paying the cost of a WAN round-trip on each locally referenced component, V, a cluster, C may optimistically create an activation for V, before running the activation creation protocol. C then runs the protocol asynchronously, while the local activation services requests from servers in C. If C finds that all other clusters in its active multi-cluster respond with ACTIVATION_RESPONSE (PASS, null), C's optimistic activation of V is either DOUBTFUL or OWNED, as described herein. Conversely, if C finds that one of the clusters in its active multi-cluster has already activated V, C kills its local activation of V, and adds a reference to the remote activation in its component directory.

Aspects of the disclosure are operable with any combination of the following. Described herein is an example providing a single-instance component in a multi-cluster distributed system of a geographically-distributed computing environment. The component is always addressable by applications via an identity of the component, including when clusters are partitioned from one another.

Another single-instance component in the multi-cluster distributed system only may be activated in a cluster when the computing environment has no clusters partitioned from one another. Still another single-instance component may be only activated in a cluster when the cluster performing the activation is part of a cluster quorum.

Further described herein is eliminating any duplicate components when clusters that were partitioned are no longer partitioned, to provide only one surviving single-instance of the component. Eliminating any duplicate components comprises performing a deterministic operation to select the surviving single-instance of the component.

Another aspect is directed towards preventing a race condition in which at least two non-partitioned clusters are concurrently attempting to activate the component, including detecting the race condition state and selecting only one winning component instance for activation. Preventing the race condition comprises performing a deterministic operation to select the winning component instance for activation.

In one or more aspects, a distributed computing system includes a plurality of clusters, each cluster having a runtime executing in at least one server memory on at least one processor. The runtime is configured to prevent race conditions in which two or more clusters are concurrently attempting to activate a component, and to allow duplicate components to exist when clusters are partitioned, including to associate state data with each possible duplicate indicating the possibly duplicate state. The runtime evaluates the state data when clusters are no longer partitioned to remove any duplicate component so as to have only one component survive for any duplicate that existed.

For a given component (or type), the runtime may be configured to prevent another component from being activated if a partition exists between clusters of the distributed computing system.

The runtime may be configured to optimistically activate a component before each other cluster has responded as to whether the component is activated on another cluster.

The runtime prevents race conditions by communicating an activation request to each other cluster with which a requesting cluster can communicate indicating the requesting cluster's intent to activate a component. When another cluster determines that the requesting cluster is in a race condition with the other cluster, the other cluster uses a tiebreaking mechanism to determine which activation request is to succeed.

The runtime removes any duplicate component by exchanging sets of possible duplicates to each other cluster with which the cluster can communicate, and using a tiebreaking mechanism to determine which duplicated component is to survive for any duplicate that existed and which duplicate or duplicates will be killed. The runtime may be configured to change the state data to indicate sole ownership by a cluster when no clusters are partitioned from one another.

One or more aspects are directed towards attempting, in an attempting cluster, to determine if a component is already activated in any other cluster with which the attempting cluster can communicate, and if so, using the already-activated component. If not already activated, a determination is made as to whether a partition exists between at least two clusters. If a partition exists, the component is activated and associated with state data indicating that the activated component is a possible duplicate.

One or more aspects are directed towards determining that at least one previously partitioned cluster is no longer partitioned, and exchanging sets of possible duplicates with at least one other cluster. If a duplicate component exists, one component is selected to survive. The state data may be changed from indicating a possible duplicate to indicating sole ownership by a cluster when no clusters are partitioned from one another.

One or more aspects are directed towards detecting a race condition in which at least two non-partitioned clusters are concurrently attempting to activate the component, and electing only one winning component instance for activation.

Also described is detecting a partition, and allowing activation of another component only when the cluster attempting the activation is part of a cluster quorum.

In a geographically-distributed computing environment, described is means for providing a single-instance component in a multi-cluster distributed system, in which the component is always addressable by applications via an identity of the component, the component addressable for applications including when clusters are partitioned from one another. Further described is means for attempting, in an attempting cluster, to determine if a component is already activated in any other cluster with which the attempting cluster can communicate and if so, means for using the already-activated component, If not already activated, described is means for determining whether a partition exists between at least two clusters, and if a partition exists, means for activating the component and associating the component with state data indicating that the activated component is a possible duplicate.

Example Networked and Distributed Environments

One of ordinary skill in the art can appreciate that the various implementations and methods described herein can be implemented in connection with any computer or other client or server device, which can be deployed as part of a computer network or in a distributed computing environment, and can be connected to any kind of data store or stores. In this regard, the various implementations described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage. It is understood that the system setup may be native mode operation (e.g., directly on hardware) or a virtualized environment, or a combination of both.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various implementations of the subject disclosure.

Figure 11:
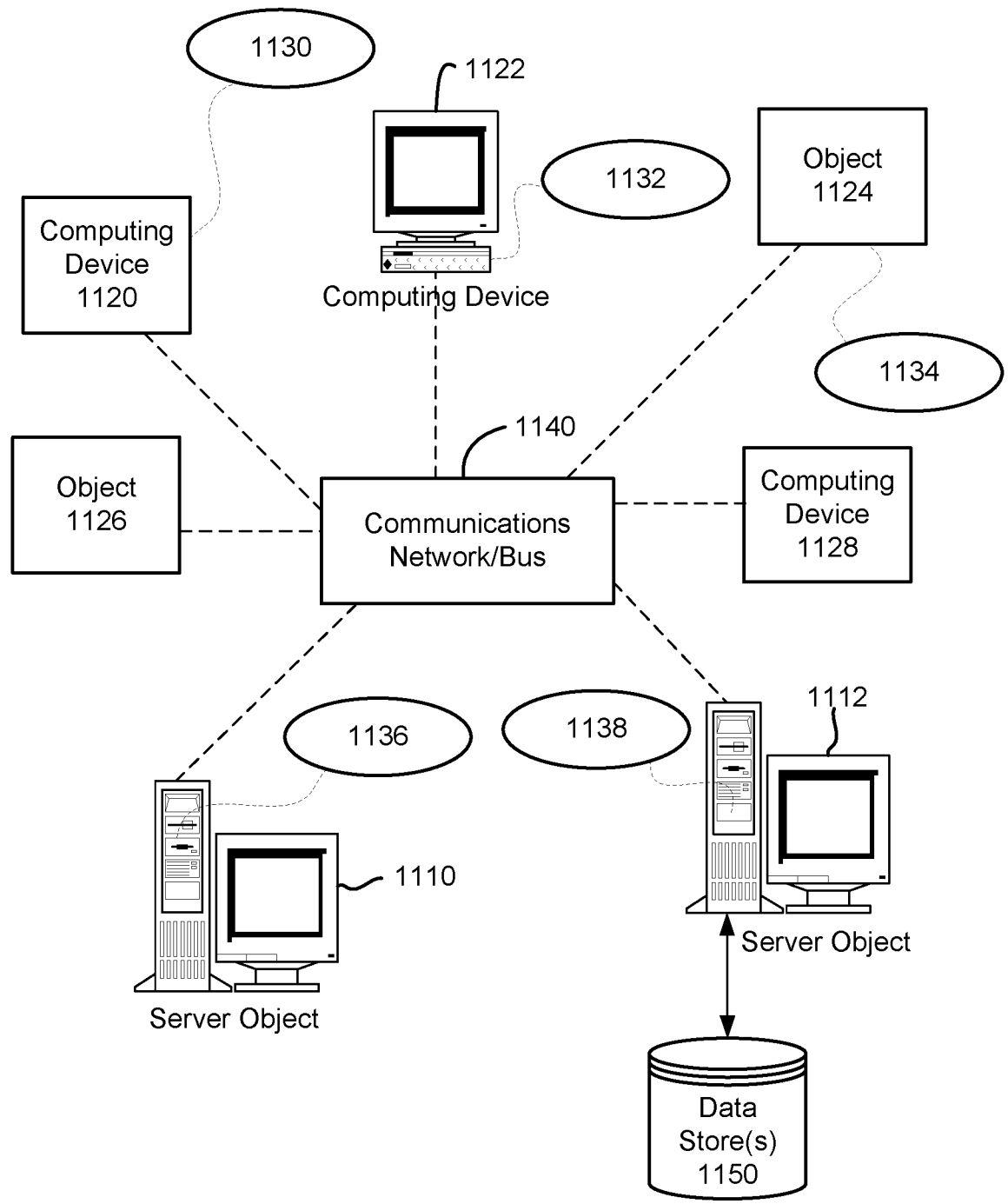
FIG. 11 is a block diagram representing an example non-limiting networked or distributed computing environment into which one or more aspects of various examples described herein can be implemented.

FIG. 11 provides a schematic diagram of an example networked or distributed computing environment. The distributed computing environment comprises computing objects 1110, 1112, etc., and computing objects or devices 1120, 1122, 1124, 1126, 1128, etc., which may include programs, methods, data stores, programmable logic, etc. as represented by example applications 1130, 1132, 1134, 1136, 1138. It can be appreciated that computing objects 1110, 1112, etc. and computing objects or devices 1120, 1122, 1124, 1126, 1128, etc. may comprise different devices, such as personal digital assistants (PDAs), audio/video devices, mobile phones, MP3 players, personal computers, laptops, etc.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1140, either directly or indirectly. Even though illustrated as a single element in FIG. 11, communications network 1140 may comprise other computing objects and computing devices that provide services to the system of FIG. 11, and/or may represent multiple interconnected networks, which are not shown. Each computing object 1110, 1112, etc. or computing object or device 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the application provided in accordance with various implementations of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various examples.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 1140 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various implementations. Accordingly, the below general purpose remote computer described below in FIG. 12 is but one example of a computing device.

Examples can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 12:
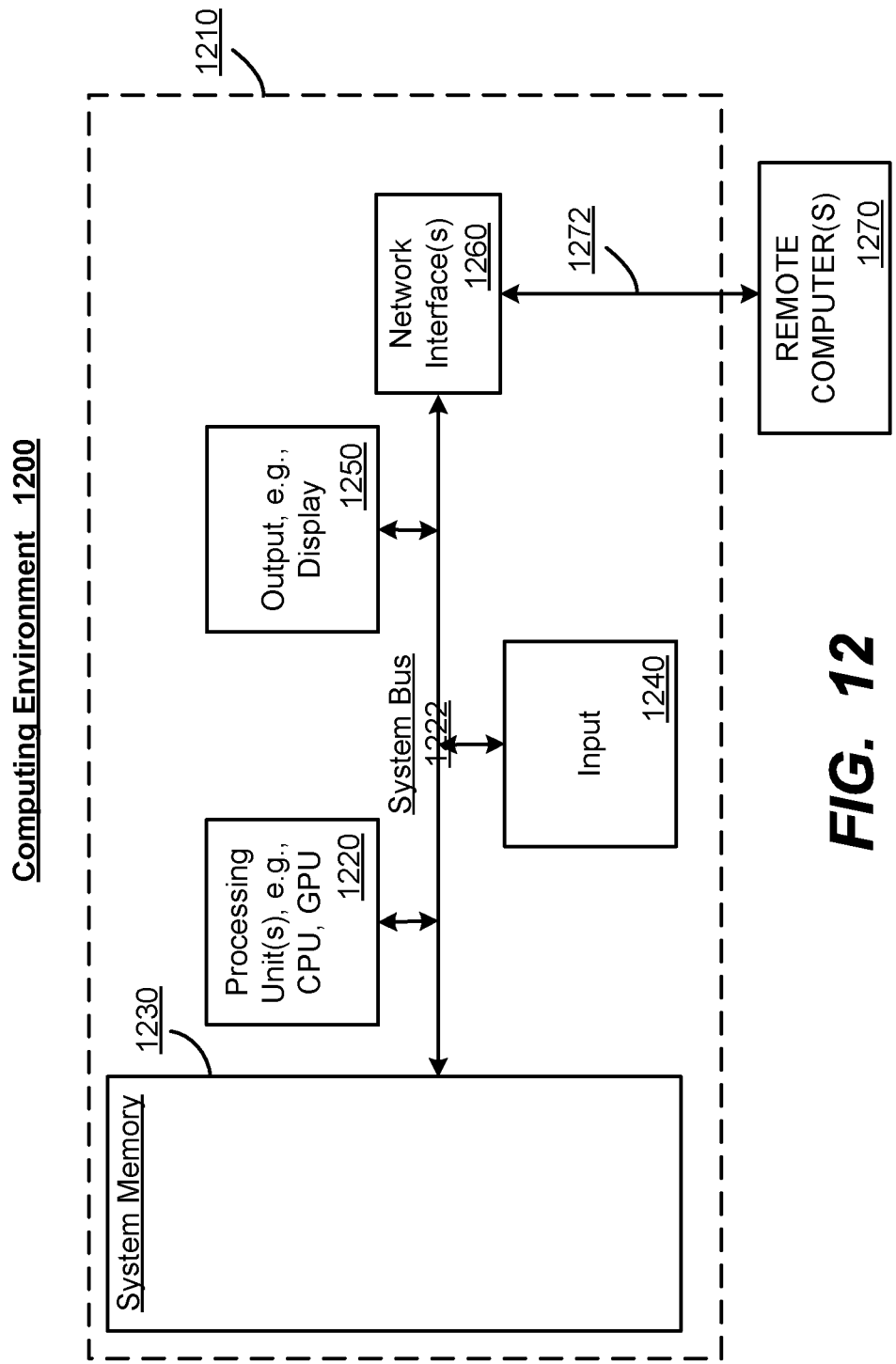
FIG. 12 is a block diagram representing an example non-limiting machine/computing device into which one or more aspects of various examples described herein can be implemented.

FIG. 12 thus illustrates an example of a suitable computing system environment 1200 in which one or aspects of the examples described herein can be implemented, although as made clear above, the computing system environment 1200 is only one example of a suitable computing environment and is not intended to suggest any limitation as to scope of use or functionality. In addition, the computing system environment 1200 is not intended to be interpreted as having any dependency relating to any one or combination of components illustrated in the example computing system environment 1200.

With reference to FIG. 12, an example remote device for implementing one or more implementations includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of machine/computer-readable media and can be any available media that can be accessed by computer 1210. The system memory 1230 may include computer storage media in the form of volatile and/or nonvolatile memory such as read only memory (ROM) and/or random access memory (RAM). By way of example, and not limitation, system memory 1230 may also include an operating system, application programs, other program modules, and program data.

A user can enter commands and information into the computer 1210 through input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, the examples herein are contemplated from the standpoint of an API (or other software object), as well as from a software or hardware object that implements one or more examples as described herein. Thus, various examples described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various examples are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method for managing components across a plurality of clusters, the method comprising:
   detecting presence of a partition between a first partitioned cluster and other clusters in the plurality of clusters;
   receiving a request from an application for usage or activation of a component in the first partitioned cluster that has no in-memory instance of the component;
   incident to the request for usage or activation of the component, automatically creating a new instance of the component on an available cluster in the first partitioned cluster; and
   incident to the detected presence of the partition between the first partition and the other clusters, assigning state data to the new instance of the component indicating the new instance of the component is possibly duplicated on other servers outside of the partitioned cluster;
   broadcasting the created new instance of the component and the assigned state data to other devices inside the partitioned cluster;
   receiving notice that another device in the partitioned cluster created a second instance of the component and assigned the state data indicating the second instance of the component is possibly duplicated on the other servers outside of the partitioned cluster; and
   deleting the new instance of the component based on the state data assigned to the second instance of the component.

2. The method of claim 1, further comprising:
   determining the first partitioned cluster is part of a quorum in the plurality of clusters; and
   based on the first partitioned cluster being part of the quorum, activating the component.

3. The method of claim 1 further comprising: detecting the partition is removed;
   determining a third instance of the component has been instantiated on a previously partitioned cluster; and
   eliminating the new instance of the component based on the third instance.

4. The method of claim 3, wherein said eliminating the new instance of the component comprises performing a deterministic operation to select a surviving single-instance of the component.

5. The method of claim 1 further comprising:
   identifying the first partitioned cluster is operating in a high-consistency mode from rules associated with a runtime; and
   performing said automatic creation of the new instance of the component incident to the first partitioned cluster operating in the high-consistency mode.

6. The method of claim 5, further comprising:
   detecting a race condition with a second instance of the component when the partition is removed; and
   selecting a winning instance of the component based on the state data associated with the created new instance and a second instance of the component.

7. A system, comprising:
   server memory associated with a plurality of servers configured into multi-cluster environment, and
   at least one processor executing at least one runtime executing the server memory, the at least one runtime configured to:
     provide a component that is addressable by applications via an identify of the component,
     detect presence of a partition separating the plurality of servers in the multi-cluster environment,
     allow duplicate components on clusters that are unable to communicate through partitioning,
     incident to said detection of the presence of the partition, activate the component and assign state data thereto in a component directory of a first partitioned cluster indicating said activation of the component is a possible duplicate of another component on other servers within the multi-cluster environment,
     broadcast the created new instance of the component and the assigned state data to other devices inside the partitioned cluster;
     receive notice that another device in the partitioned cluster created a second instance of the component and assigned the state data indicating the second instance of the component is possibly duplicated on the other servers outside of the partitioned cluster; and
     delete the new instance of the component based on the state data assigned to the second instance of the component.

8. The system of claim 7, wherein the component is not instantiated in the server memory upon receipt of a request to use the component and, based on the received request, automatically creating the new instance of the component in the server memory.

9. The system of claim 7 wherein the at least one runtime is configured to activate a component before other clusters have responded as to whether the component is activated on another cluster.

10. The system of claim 7 wherein the at least one runtime prevents race conditions of different instances of the component through communicating an activation request to other clusters with which a requesting cluster can communicate indicating an intent of the requesting cluster intent to activate the at least one of the duplicate components.

11. The system of claim 10, wherein the at least one runtime further configured to perform a tiebreaking mechanism to solve race conditions between multiple activations of the components after a partition between different clusters is removed.

12. The system of claim 7 further, wherein the at least one runtime removes one or more duplicate components through exchanging sets of possible duplicates to other clusters with which the cluster can communicate.

13. The system of claim 7 wherein the at least one runtime is configured to change the state data to indicate sole ownership by a cluster when no clusters are partitioned from one another.

14. One or more machine-readable storage media devices embodied with machine-executable instructions that, when executed by one or more processors, perform operations for reducing duplicate virtual components in a cluster of servers, the operations comprising:
   determining, by a computing device, a component is not already instantiated on a cluster of servers with which the computing device can communicate;

detecting a partition separating the cluster of servers from other servers in a total multi-cluster group of servers; and incident to said detection of the partition, directing a runtime to activate the component and assign state data thereto in a component directory of a first partitioned cluster indicating said activation of the component is a possible duplicate of another component on other servers outside of the partitioned cluster;

broadcasting the created new instance of the component and the assigned state data to other devices inside the partitioned cluster;

receiving notice that another device in the partitioned cluster created a second instance of the component and assigned the state data indicating the second instance of the component is possibly duplicated on the other servers outside of the partitioned cluster; and deleting the new instance of the component based the state data assigned to the second instance of the component.

15. The one or more machine-readable storage media devices of claim 14 having further machine-readable instructions comprising, determining that at least one previously partitioned cluster is no longer partitioned, and exchanging sets of possible duplicates with at least one other cluster.

16. The one or more machine-readable storage media devices of claim 14 having further machine-readable instructions comprising, determining that a duplicate component exists, and selecting one component to survive.

17. The one or more machine-readable storage media devices of claim 14 having further machine-readable instructions comprising detecting a race condition in which at least two non-partitioned clusters are concurrently attempting to activate the component, and electing only one winning component instance for activation.

18. The one or more machine-readable storage media devices of claim 15 having further machine-readable instructions comprising, detecting a partition, and allowing activation of another component only when the cluster attempting the activation is part of a cluster quorum.

19. The method of claim 1 further comprising:
detecting the partition is removed;
determining a third instance of the component has been instantiated on a previously partitioned cluster; and
eliminating the third instance of the component based on the new instance of the component.

20. The one or more machine-readable storage media devices of claim 16 having further machine-readable instructions for:
detecting the partition is removed;
determining a third instance of the component has been instantiated on a previously partitioned cluster; and
eliminating the third instance of the component based on the new instance of the component.

* * * * *